United States Patent
Tomar et al.

(10) Patent No.: US 12,141,603 B2
(45) Date of Patent: Nov. 12, 2024

(54) QUALITY OF SERVICE FOR CLOUD BASED STORAGE SYSTEM USING A WORKLOAD IDENTIFIER

(71) Applicant: NETAPP, INC., San Jose, CA (US)

(72) Inventors: Bipin Tomar, Morrisville, NC (US); Jawahar Tadipatri, Apex, NC (US); Ranjit Baradwaj Nandagopal, Morrisville, NC (US)

(73) Assignee: NETAPP, INC., San Jose, CA (US)

( * ) Notice: Subject to any disclaimer, the term of this patent is extended or adjusted under 35 U.S.C. 154(b) by 570 days.

(21) Appl. No.: 17/389,987

(22) Filed: Jul. 30, 2021

(65) Prior Publication Data

US 2023/0031741 A1    Feb. 2, 2023

(51) Int. Cl.
*G06F 9/48* (2006.01)
*G06F 3/06* (2006.01)
*G06F 9/50* (2006.01)
*G06F 9/54* (2006.01)

(52) U.S. Cl.
CPC .......... *G06F 9/4843* (2013.01); *G06F 3/0604* (2013.01); *G06F 3/061* (2013.01); *G06F 3/0631* (2013.01); *G06F 3/0659* (2013.01); *G06F 3/067* (2013.01); *G06F 9/5016* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 7,539,143 B2 | 5/2009 | Moores et al. | |
| 8,407,413 B1 | 3/2013 | Yucel et al. | |
| 8,612,284 B1* | 12/2013 | Sharif | G06F 3/067 |
| | | | 707/812 |
| 8,918,493 B1* | 12/2014 | Beach | G06F 9/5077 |
| | | | 709/223 |
| 9,411,834 B2 | 8/2016 | Hrischuk et al. | |
| 9,542,103 B2 | 1/2017 | Faulkner et al. | |
| 9,542,293 B2 | 1/2017 | Sprague et al. | |
| 9,542,346 B2 | 1/2017 | Hrischuk et al. | |
| 9,547,445 B2 | 1/2017 | Faulkner et al. | |
| 9,870,330 B2 | 1/2018 | Faulkner et al. | |
| 9,930,133 B2 | 3/2018 | Susarla et al. | |
| 10,146,462 B2 | 12/2018 | Karale et al. | |
| 10,313,251 B2 | 6/2019 | Kalman et al. | |
| 10,439,900 B2 | 10/2019 | Wright et al. | |

(Continued)

*Primary Examiner* — Abu Zar Ghaffari
(74) *Attorney, Agent, or Firm* — LOZA & LOZA, LLP

(57) ABSTRACT

Methods and systems for providing Quality of Service (QoS) in a cloud-based system are provided. One method includes assigning, by a micro-service, a workload identifier to a cloud volume created by a storage operating system in a cloud-based system; mapping, by the micro-service, the workload identifier to a volume identifier, the volume identifier generated by the storage operating system to identify the cloud volume; associating, by the micro-service, a policy with the cloud volume for providing QoS for the cloud volume; determining, by the micro-service, the workload identifier for the cloud volume from the volume identifier included in a request to store or retrieve data using the cloud volume; and assigning, by the micro-service, the workload identifier to a processing thread deployed by the storage operating system to process the request.

20 Claims, 7 Drawing Sheets

(56) References Cited

U.S. PATENT DOCUMENTS

| | | | |
|---|---|---|---|
| 10,798,207 B2 | 10/2020 | Susarla et al. | |
| 10,855,556 B2 | 12/2020 | Kalman et al. | |
| 10,944,679 B2 | 3/2021 | Kalman et al. | |
| 10,951,488 B2 | 3/2021 | Wright et al. | |
| 11,140,219 B1 | 10/2021 | Cady | |
| 11,271,843 B1 | 3/2022 | Cady | |
| 11,372,689 B1* | 6/2022 | Allen | G06F 9/4887 |
| 11,392,315 B1 | 7/2022 | Cady | |
| 2005/0073956 A1 | 4/2005 | Moores et al. | |
| 2005/0089054 A1 | 4/2005 | Ciancaglini et al. | |
| 2014/0047099 A1* | 2/2014 | Flores | H04L 67/75 709/224 |
| 2014/0122707 A1* | 5/2014 | de Assuncao | H04L 41/5067 709/224 |
| 2015/0199136 A1 | 7/2015 | Faulkner et al. | |
| 2015/0199139 A1 | 7/2015 | Faulkner et al. | |
| 2015/0199148 A1 | 7/2015 | Hrischuk et al. | |
| 2015/0199253 A1 | 7/2015 | Sprague et al. | |
| 2015/0199388 A1 | 7/2015 | Hrischuk et al. | |
| 2016/0119443 A1 | 4/2016 | Susarla et al. | |
| 2016/0259742 A1 | 9/2016 | Faulkner et al. | |
| 2017/0222935 A1 | 8/2017 | Kalman et al. | |
| 2017/0317895 A1 | 11/2017 | Wright et al. | |
| 2018/0176323 A1 | 6/2018 | Susarla et al. | |
| 2018/0314445 A1 | 11/2018 | Karale et al. | |
| 2018/0351876 A1* | 12/2018 | Ren | H04L 47/808 |
| 2019/0245794 A1 | 8/2019 | Kalman et al. | |
| 2020/0036604 A1 | 1/2020 | Kalman et al. | |
| 2020/0127900 A1 | 4/2020 | Wright et al. | |
| 2020/0133541 A1* | 4/2020 | Kleiner | G06F 3/065 |
| 2020/0150977 A1* | 5/2020 | Wang | G06F 9/45558 |
| 2021/0141694 A1* | 5/2021 | Cope | G06F 11/2094 |
| 2021/0168080 A1 | 6/2021 | Kalman et al. | |
| 2021/0211363 A1* | 7/2021 | Papacica | H04L 41/5051 |
| 2021/0266358 A1 | 8/2021 | Cady | |
| 2021/0314393 A1 | 10/2021 | Cady | |
| 2021/0334206 A1* | 10/2021 | Colgrove | G06F 3/0638 |
| 2021/0334247 A1 | 10/2021 | Longo et al. | |
| 2021/0373956 A1* | 12/2021 | Krasner | G06F 9/5027 |
| 2022/0030057 A1 | 1/2022 | Cady | |
| 2022/0171663 A1 | 6/2022 | Hiregoudar et al. | |
| 2022/0261362 A1 | 8/2022 | Longo et al. | |
| 2022/0278943 A1 | 9/2022 | Longo et al. | |
| 2022/0308908 A1* | 9/2022 | Zheng | G06F 9/45558 |
| 2022/0317888 A1 | 10/2022 | Longo et al. | |
| 2023/0153008 A1* | 5/2023 | Yoshida | G06F 3/0647 711/165 |
| 2023/0393950 A1* | 12/2023 | Wang | G06F 11/1451 |

\* cited by examiner

QUALITY OF SERVICE FOR CLOUD BASED STORAGE SYSTEM USING A WORKLOAD IDENTIFIER

TECHNICAL FIELD

The present disclosure relates to cloud-based storage systems, and more particularly, to providing quality of service ("QoS") in the cloud-based storage systems.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices. Storage systems are used by different applications, for example, database systems, electronic mail (email) servers, virtual machines executed within virtual machine environments (for example, a hypervisor operating environment) and others to store and protect data.

Storage today is also made available in a cloud computing environment where storage space is presented and shared across different platforms. Cloud computing means computing capability that provides an abstraction between a computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud specific services.

QoS is provided by on-premise storage systems for managing overall performance of storage systems. QoS is not easy to provide in cloud-based systems because a storage operating system executed in a cloud-based, container environment may not have access to operating system schedulers, which makes it difficult to throttle read and write requests and hence provide QoS. Continuous efforts are being made to develop technology to efficiently provide QoS for data stored in cloud-based, container environments.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

Figure 1:
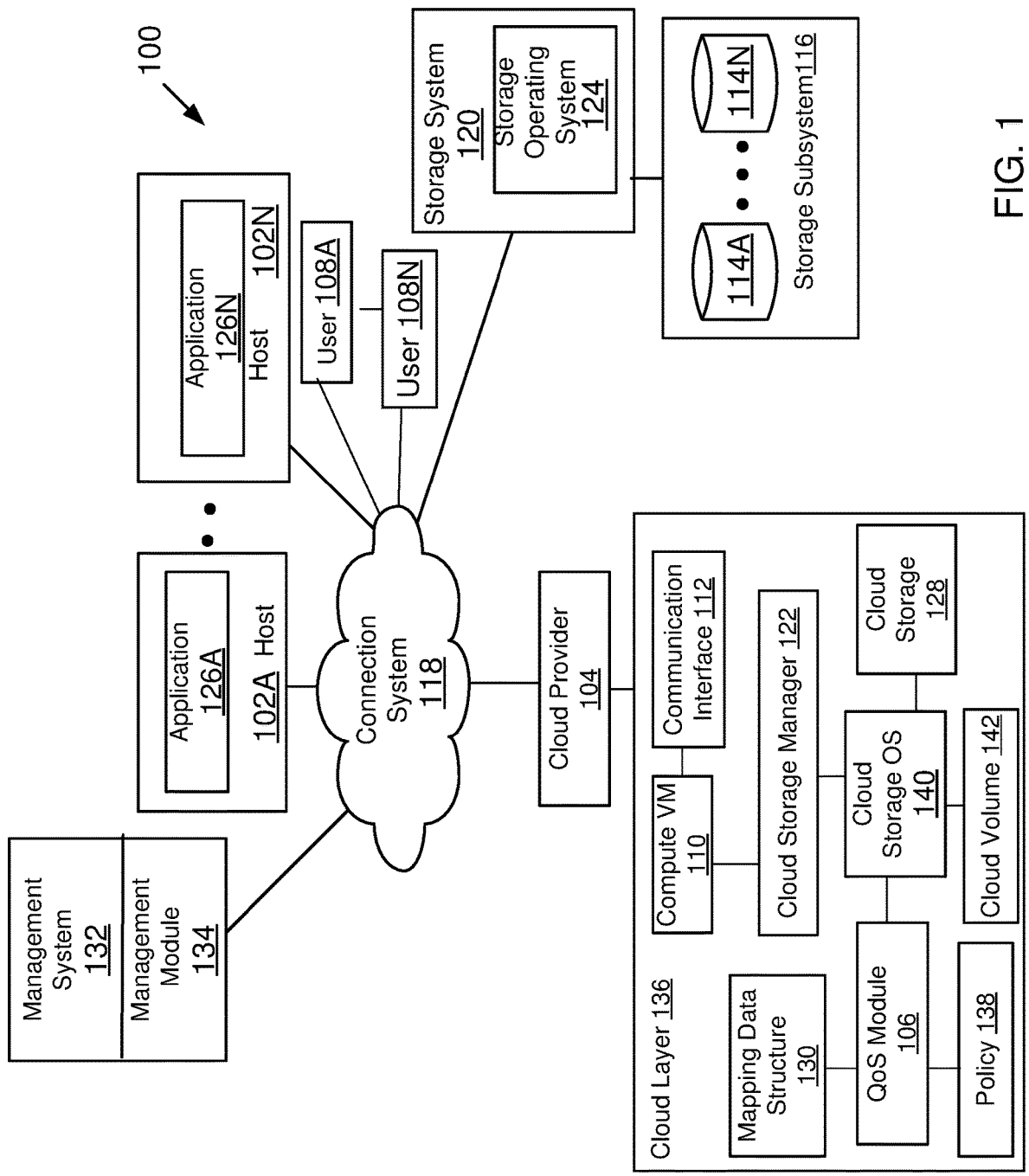
FIG. 1 shows an example of an operating environment for providing quality of service ("QoS"), according to various aspects of the present disclosure.

In one aspect, innovative computing technology is disclosed to provide Quality of Service (QoS) for storage accessed via a cloud-based system. QoS means managing resources for providing policy-based throughput and/or a number of input/output ("I/O") operations within a defined time (e.g., a second) (IOPS) for a storage object, including a storage volume and a logical unit ("LUN"), as described below.

In an on-premise storage system, a storage operating system provides QoS by tracking a "service time" and a "wait time" for processing I/O requests for reading and writing data. The service time is the duration, a processor (or a processing thread) spends to process a request, while the wait time is the duration a request waits to be selected for service by the processor. The storage operating system is typically executed within an operating system of the storage system (e.g., a FreeBSD operating system with a kernel space and a user space). The processing thread scheduling is typically controlled by a FreeBSD operating system scheduler and a storage operating system scheduler. This is difficult to apply in a cloud-based system, because a cloud based storage operating system uses user space threads provided by a container environment, and within a container (described below), the cloud based storage operating system does not have access to the operating system threads/operating system scheduler to track service and wait times.

This disclosure describes computing technology to implement a QoS module in a container-based, cloud-based system, as a micro-service. The QoS module assigns a workload identifier ("ID") (also referred to as a QoS workload ID) to each cloud volume, defined below in detail. Upon creation, the QoS module automatically assigns a policy to the cloud volume to enforce performance limits (e.g., IOPS, throughput or both IOPS and throughput). The policy can be applied to one cloud volume or across multiple cloud volumes that are part of a storage volume group, a logical entity maintained the cloud storage operating system. When applied to a storage volume group, the policy parameters of a policy are automatically scaled up or down, based on when a cloud volume is added, deleted or re-sized. In one aspect, the QoS module also assigns the workload ID to each I/O request for the cloud volume. This enables the QoS module to track progress of each I/O request as it is being processed in the container environment, described below in detail.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components may be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

System 100: FIG. 1 shows an example of a system 100 to implement the various adaptive aspects of the present disclosure. In one aspect, system 100 includes a cloud layer 136 having a cloud storage manager (may also be referred to as "cloud manager") 122, a cloud storage operating system (may also be referred to as "Cloud Storage OS") 140 having access to cloud storage 128, and a QoS module 106. The QoS module 106 maintains a mapping data structure 130 and policy 138 to provide QoS, as described below in detail.

As an example, a cloud provider 104, provides access to the cloud layer 136 and its components via a communication interface 112. A non-limiting example of the cloud layer 136 is a cloud platform, e.g., Amazon Web Services ("AWS") provided by Amazon Inc., Azure provided by Microsoft Corporation, Google Cloud Platform provided by Alphabet Inc. (without derogation of any trademark rights of Amazon Inc., Microsoft Corporation or Alphabet Inc.), or any other cloud platform. In one aspect, communication interface 112 includes hardware, circuitry, logic and firmware to receive and transmit information using one or more protocols. As an example, the cloud layer 136 can be configured as a virtual private cloud (VPC), a logically isolated section of a cloud infrastructure that simulates an on-premise data center with an on-premise, storage system 120.

In one aspect, the cloud manager 122 includes a user interface provided to or by the cloud provider 104, e.g., AWS or any other cloud service. The cloud manager 122 is provided as a software application running on a computing device or within a VM for configuring, protecting and managing storage objects. In one aspect, the cloud manager 122 enables access to a storage service (e.g., backup, restore, cloning or any other storage related service) from a micro-service made available from the cloud layer 136. In one aspect, the cloud manager 122 stores user information including a user identifier, a network domain for a user device, a user account identifier, or any other information to enable access to storage from the cloud layer 136.

Software applications for cloud-based systems are typically built using "containers," which may also be referred to as "micro-services." Kubernetes is an open-source software platform for deploying, managing and scaling containers including the cloud storage OS 140 and the QoS module 106. Azure is a cloud computing platform provided by Microsoft Corporation (without derogation of any third-party trademark rights) for building, testing, deploying, and managing applications and services including the cloud storage OS 140 and the QoS module 106. Azure Kubernetes Service enables deployment of a production ready Kubernetes cluster in the Azure cloud for executing the cloud storage OS 140 and the QoS module 106. It is noteworthy that the adaptive aspects of the present disclosure are not limited to any specific cloud platform.

The term "micro-service" as used herein denotes computing technology for providing a specific functionality in system 100 including QoS and access to storage via the cloud layer 136. As an example, the cloud storage OS 140 and the QoS module 106 are micro-services, deployed as containers (e.g., "Docker" containers), are stateless in nature, may be exposed as a REST (representational state transfer) application programming interface (API) and are discoverable by other services. Docker is a software framework for building and running micro-services using the Linux operating system kernel (without derogation of any third-party trademark rights). As an example, when implemented as docker containers, docker micro-service code for the cloud storage OS 140 and the QoS module 106 is packaged as a "Docker image file". A Docker container for the cloud storage OS 140 and the QoS module 106 is initialized using an associated image file. A Docker container is an active or running instantiation of a Docker image. Each Docker container provides isolation and resembles a lightweight virtual machine. It is noteworthy that many Docker containers can run simultaneously in a same Linux based computing system. It is noteworthy that although a single block is shown for the QoS module 106 and the cloud storage OS 140, multiple instances of each micro-service (i.e., the QoS module 106 and the cloud storage OS 140) can be executed at any given time to accommodate multiple user systems 108.

In one aspect, the QoS module 106 and the cloud storage OS 140 can be deployed from an elastic container registry (ECR). As an example, ECR is provided by AWS (without derogation of any third-party trademark rights) and is a managed container registry that stores, manages, and deploys container images. The various aspects described herein are not limited to the Linux kernel or using the Docker container framework.

An example of the cloud storage OS 140 includes the "CLOUD ONTAP" provided by NetApp Inc., the assignee of this application. (without derogation of any trademark rights) The cloud storage OS 140 is a software defined version of a storage operating system 124 executed within the cloud layer 136 or accessible to the cloud layer 136 to provide storage and storage management options that are available via the storage system 120, also referred to as an "on-premise" storage system. The cloud storage OS 140 has access to cloud storage 128, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes (shown as cloud volume 142). An example of the cloud-based storage service is the "Cloud Volume Service," provided by NetApp Inc. (without derogation of any trademark rights). The term volume or cloud volume (used interchangeably throughout this specification) means a logical object, also referred to as a storage object, configured to store data files (or data containers or data objects), scripts, word processing documents, executable programs, and any other type of structured or unstructured data. From the perspective of a user system 108, each cloud volume can appear to be a single storage drive. However, each cloud volume can represent the storage space in one storage device, an aggregate of some or all the storage space in multiple storage devices, a RAID group, or any other suitable set of storage space. The various aspects of the present disclosure may include both the Cloud storage OS 140 and the cloud volume service or either one of them. Details of using the various components of the cloud layer 136 are provided below.

For a traditional on-premise, storage system 120, QoS is provided by monitoring and controlling processing of I/O requests for writing and reading stored data. This is typically implemented by a management module 134 of a management system 132 and the storage operating system 124. Prior to this disclosure, this option was unavailable for cloud-based storage in a containerized environment (e.g., via the Cloud Volume Service/Cloud Storage OS 140). The QoS module 106 disclosed herein is configured to provide QoS to manage performance of compute and storage resources. To provide QoS, the QoS module 106 enables an application (e.g., 126) to limit a maximum number of IOPS (input/out requests per second), as well as throughput (e.g., transferred data e.g., in bytes/second) as described below in detail.

In one aspect, the QoS module 106 assigns a workload ID to each storage volume in the container environment, e.g., the cloud volume 142. Upon creation, the QoS module 106 automatically assigns the policy 138 to the cloud volume 142 to enforce performance limits (e.g., IOPS, throughput or both IOPS and throughput). The policy 138 can be applied to just cloud volume 142 or across multiple volumes that are part of a storage volume group, a logical entity maintained by the cloud storage OS 140. When applied to a storage volume group, parameters of policy 138 (e.g. IOPS and/or throughput) are automatically scaled up or down, based on when a cloud volume is added, deleted or re-sized.

In one aspect, the QoS module 106 also assigns the workload ID to each I/O request for the cloud volume 142. This enables the QoS module 106 to track the progress of each I/O request as it is being processed in the container environment.

As described above, storage system 120 executing a storage operating system 124 typically provides QoS by tracking service time and wait time. The storage operating system 124 is typically executed within an operating system of the storage system 120 (e.g., a FreeBSD operating system with a kernel space and a user space). The scheduling of processing threads is typically controlled by a FreeBSD operating system scheduler (not shown) and a storage system 124 scheduler (not shown).

The QoS solution of storage system 120 is difficult to apply in a container environment because cloud storage OS 140 uses user space threads provided by a Container Runtime Environment ("CRE") e.g., the Docker container environment. Within a container, the cloud storage OS 140 does not have access to FreeBSD operating system threads including scheduler threads to track the service and wait times that are available to the storage operating system 124 in an on-premise system.

To overcome, these shortcomings, the cloud storage OS 140 is enhanced to provide QoS in the container environment. For example, the cloud storage OS 140 uses a virtual thread context (e.g., Scheduler 311, FIG. 3), instead of the FreeBSD thread context (or any underlying operating system thread) to track the workload ID that is assigned by the QoS Module 106. The virtual thread context is provided the workload ID, and when a processing thread begins operating on an I/O request, the workload ID from the I/O request is used to track the wait time and the service time. Each time, a processing thread is switched, the QoS module 106 tracks the wait time and the service time using the workload ID to monitor and throttle I/O request processing by a processing thread.

In conventional systems, a QoS policy is typically set manually by a user. In the container environment, this process is now automated, e.g., when the cloud volume 142 is created, the QoS module 106 automatically assigns policy 138. The policy parameters define IOPS, throughput or both IOPS and throughput. In one aspect, policy 138 is configured as an independent object that may include one or more of a policy identifier, a policy name, a policy description, number of IOPS, throughput and other parameters, a backup schedule, a retention count as to how long a backup is to be retained, replication schedule and other attributes. It is noteworthy that the policy object may be shared across multiple application instances. Furthermore, the same policy object can be used for a storage volume group across multiple cloud volumes. This saves storage space because the system stores one policy object for the group instead of multiple policy objects and saves processing time in maintaining one policy object versus multiple policy objects.

The present disclosure has also improved the technology for creating QoS workloads to track volumes. For example, in conventional storage system 120, a user is typically provided a volume create application programming interface ("API") and the storage operating system 124 plugs into the volume create API to create a volume with a volume identifier and a QoS workload ID. With the present disclosure, the QoS module 106 automatically creates a QoS workload ID for the cloud volume 142. This also triggers creating a new policy (e.g., 138) or attaching the cloud volume 142 to an existing policy. If the volume is offline i.e. no longer mounted, the QoS module 106 automatically deletes the workload ID from the mapping data structure 130 and may also delete the associated policy 138. This makes the overall performance management efficient because the QoS module 106 only manages the workload IDs that are active at a given time.

In yet another aspect, the cloud volume 142 created by the cloud storage OS 140 may use storage device/storage system provided by another entity, e.g., a volume is created from a LUN that is exposed or presented by a different entity. The technology provided herein can leverage the storage provided by another entity. The QoS module 106 provides the workload ID to the storage system that implements QoS policies using the workload ID, as described below in detail.

Referring back to FIG. 1, System 100 may also include one or more computing systems 102A-102N (shown as host 102, 102A-102N and may also be referred to as a "host system 102", "host systems 102", "server 102" or "servers 102") communicably coupled to a storage system 120 (may also be referred to as an "on-premise" storage system) executing a storage operating system 124 via the connection system 118 such as a local area network (LAN), wide area network (WAN), the Internet and others. As described herein, the term "communicably coupled" may refer to a direct connection, a network connection, or other connections to provide data-access service to user consoles (or computing devices) 108A-108N (may also be referred to as "user 108," "users 108," "client system 108" or "client systems 108").

Client systems 108 are computing devices that can access storage space at the storage system 120 via the connection system 118 or from the cloud layer 136 presented by the cloud provider 104 or any other entity. The client systems 108 can also access computing resources, as a virtual machine ("VM") (e.g., compute VM 110) via the cloud layer 136. A client may be the entire system of a company, a department, a project unit or any other entity. Each client system is uniquely identified and optionally, may be a part of a logical structure called a storage tenant (not shown). The storage tenant represents a set of users (may also be referred to as storage consumers) for the cloud provider 104 that provides access to cloud-based storage and/or compute resources (e.g., 110) via the cloud layer 136 and/or storage managed by the storage system 120.

In one aspect, host systems 102A-102N of system 100 are configured to execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 to store information at storage devices, as described below. Although hosts 102 are shown as stand-alone computing devices, they may be made available from the cloud layer 136 as compute nodes executing applications 126 within VMs (shown as compute VM 110).

Each host system 102 interfaces with the management module 134 of the management system 132 for managing backups, restore, cloning and other operations for a non-cloud-based storage system, e.g., storage system 120. In this context the management system 132 is referred to as an "on-premise" management system. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the on-premise, storage system 120 has access to a set of mass storage devices 114A-114N (may also be referred to as "storage devices 114" or "storage device 114") within at least one storage subsystem 116. The storage devices 114 may include writable storage device media such as solid state drives, storage class memory, magnetic disks, video tape, optical, DVD, magnetic tape, non-volatile memory devices, for example, self-encrypting drives, or any other storage media adapted to store structured or non-structured data. The storage devices 114 maybe organized as one or more groups of Redundant Array of Independent (or Inexpensive) Disks (RAID). The various aspects disclosed are not limited to any specific storage device or storage device configuration.

The storage system 120 provides a set of storage volumes (may also be referred to as "volumes") directly to host systems 102 via the connection system 118. In another aspect, the storage volumes are presented by the cloud storage OS 140, and in that context a storage volume is referred to as a cloud volume (e.g., 142). The storage operating system 124/cloud storage OS 140 present or export data stored at storage devices 114/cloud storage 128 as a volume (or a logical unit number (LUN) for storage area network ("SAN") based storage).

The storage operating system 124/cloud storage OS 140 are used to store and manage information at storage devices 114/cloud storage 128 based on a request generated by application 126, user 108 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 138 to read or write data on behalf of the host system 102, and issues a response containing the requested data over the network 118 to the respective host system 102.

Although storage system 120 is shown as a stand-alone system, i.e. a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 (or the cloud storage OS 140) can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer can span one or more physical nodes, each of which can hold storage associated with one or more VServers. User systems 108/host 102 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 136 may execute a VM environment where a physical resource is time-shared among a plurality of independently operating processor executable VMs (including compute VM 110). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Process Flows: FIGS. 2A-2E show various process flows for implementing the innovative technology of the present disclosure in a cloud-based, containerized environment that enables access to storage space via cloud-based storage volumes (142, FIG. 1), according to one aspect of the present disclosure. Although the various process blocks appear to be in a chronological order, they can be implemented in any order. The process blocks are executed by one or more processors within the cloud layer 136 (FIG. 1) executing instructions out of a non-transitory memory. The process blocks can be executed by a computing device (or by a VM) of the cloud layer 136.

Figure 2A:
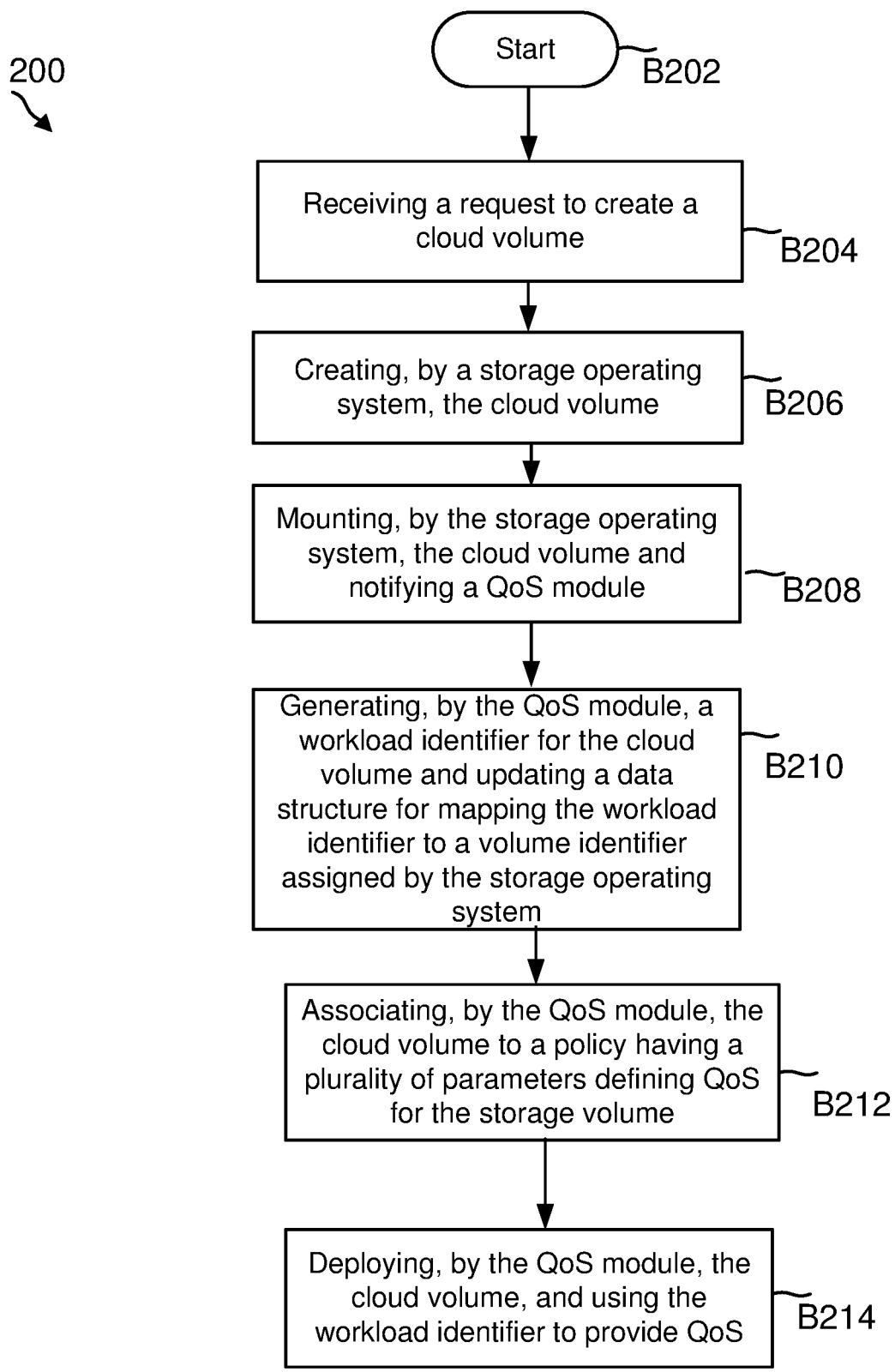
FIG. 2A shows a process for using a workload identifier by a QoS module, according to one aspect of the present disclosure.

FIG. 2A shows a process 200 for configuring the cloud volume 142, according to one aspect of the present disclosure. Process 200 begins in block B202, when the various components of the cloud layer 136 have been initialized and operational. As an example, a user interface (not shown) provided by the cloud storage manager 122 is made available to a user system 108 to configure the cloud storage volume 142. The cloud storage manager 122 interfaces with the cloud storage OS 140 to configure the cloud volume 142. The cloud storage OS 140 also interfaces with the QoS module 106 for executing the process blocks of process 200.

In block B204, a request to create a storage volume (e.g., 142) is received by the cloud storage OS 140. As an example, the request is received from the user system 108/host 102 and forwarded by the cloud storage manager 122 to the cloud storage OS 140.

In block B206, the cloud storage OS 140 creates the cloud volume 142. The cloud storage OS 140 sets a file system protocol (e.g., NFS, SMB (Server Message Block) or any other protocol) that is used to read and write data using the cloud storage volume 142. The cloud storage OS 140 also assigns a volume identifier (e.g., a volume name or any other parameter), a geographical region indicating where data associated with the cloud storage volume 142 will be stored, a time zone, a volume path to access the cloud volume 142, an allocated storage capacity for the cloud volume 142, a protocol version, e.g., if NFS is selected as the protocol, a NFS version, namely, NFSv3, NFSv4.1 or both can be selected, a security option, network access parameters (e.g., Internet Protocol addresses, network domain and other parameters) that will enable access to the cloud volume 142 via the connection system 118, and a storage volume group identifier, if the cloud volume 142 is to be part of a storage volume group.

In block B208, the cloud storage OS 140 mounts the cloud volume 142 using the designated volume path i.e. the cloud volume 142 is brought online. The term "mount" in this context means mounting the cloud volume 142 to a junction. The following command may be used by the cloud storage OS 140 to mount the cloud volume 142: "volume mount-vserver svm_name-volume volume_name-junction-path junction_path." The vserver Svm_name indicates the name of a virtual storage server that is used for the cloud volume 142, the volume-name indicates the name of the volume and the junction_path indicates the path to access the volume. The cloud storage OS 140 also notifies the QoS module 106 of the cloud volume 142.

In block 210, in response to the notification, the QoS module 106 automatically generates a workload ID for the cloud volume 142. The workload ID is controlled and managed by the QoS module 106 to provide QoS for the cloud volume 142. The QoS module 106 updates the mapping data structure 130 to map the workload ID to the volume identifier assigned by the cloud storage OS 140.

In block B212, the QoS module 106 automatically associates the policy 138 to the cloud volume 142. The policy 138 is either an existing policy or a new policy is created for the cloud volume 142. The associated policy 138 is identified by a policy identifier and a policy name, and defines QoS parameters for the cloud volume 142, e.g., the number of IOPS, throughput or any other parameter. It is noteworthy that policy 138 may be shared across multiple volumes, when the cloud storage volume 142 is part of a storage volume group. This is different from conventional systems, where a user must manually assign a policy to a storage volume vis-À-vis the QoS module 106 automatically assigning the policy 138.

In block B214, the cloud volume 142 is deployed by the cloud storage OS 140 to store and retrieve data on behalf of user systems 108. The data can be saved at the cloud storage 128 and/or the storage system 116 via network 118. The workload ID assigned by the QoS module 106 is used to implement policy based QoS. For example, the workload II) is used to track the number of IOPS that are processed for the cloud volume 142 at any given time. If the number of IOPS are below a threshold, then more I/O requests are processed to increase the number of IOPS. If the number of IOPS are above a threshold, then I/O requests are held to reduce the number of IOPS to the threshold value. Similar techniques are used to throttle I/O processing to meet the throughput threshold that defines the amount of data that is transferred for the cloud volume 142.

In one aspect, to process 110 requests, read and write request queues (not shown) are maintained to stage 1/O requests. The request processing can be throttled by the QoS module 106 to meet the QoS requirements for the cloud volume 142.

Process 200 has advantages over conventional systems that cannot efficiently provide QoS in a cloud-based environment. The QoS module 106 enables automatic policy and a workload ID assignment. The volume identifier that is assigned by cloud storage OS 140 may not be available at a protocol layer and may also change when the cloud volume 142 moves to another aggregate. The workload ID remains consistent and managed by the QoS module 106 that manages QoS as a microservice.

Figure 2B:
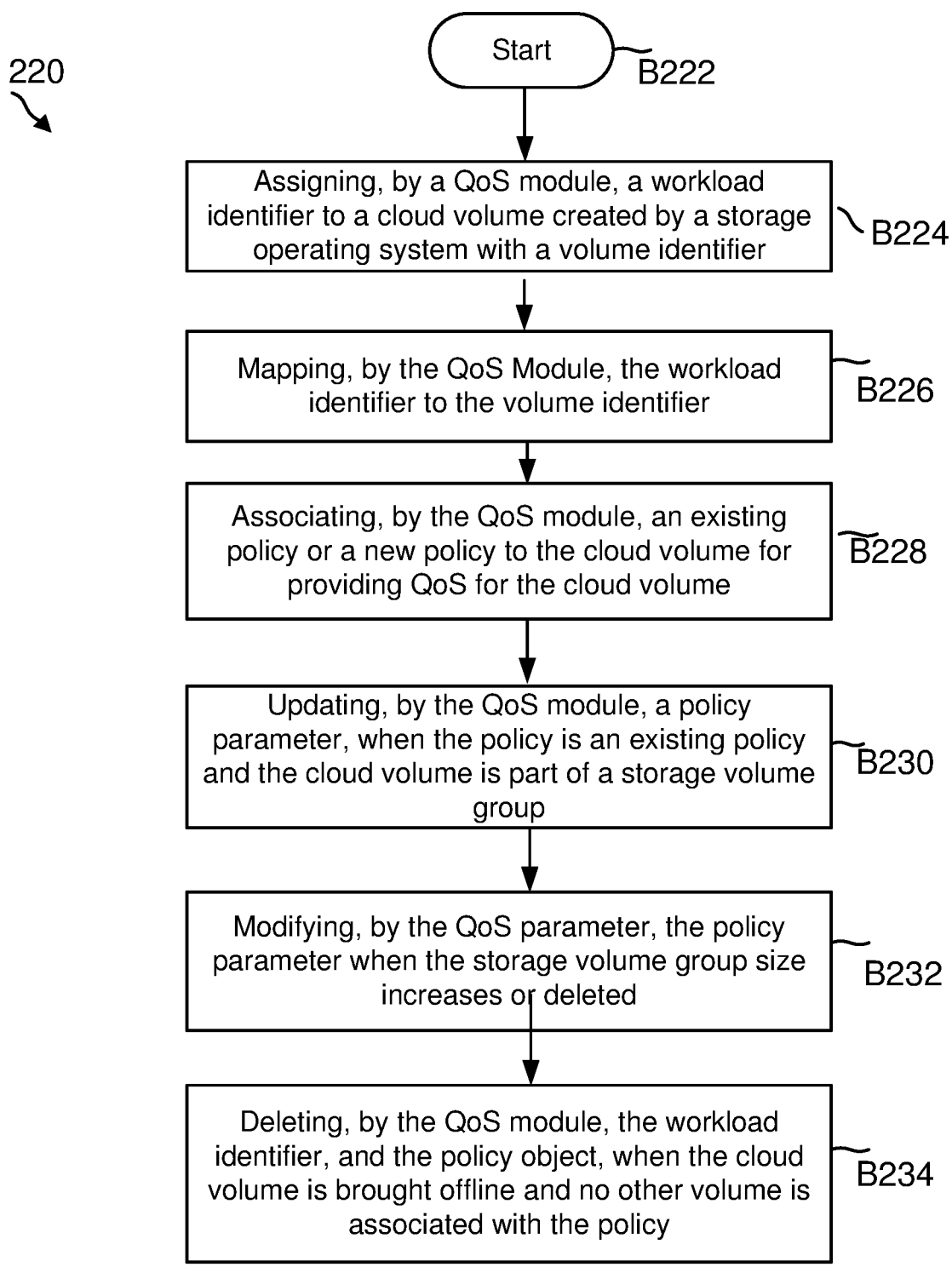
FIG. 2B shows a process for managing policy by the QoS module to provide QoS, according to one aspect of the present disclosure.

FIG. 2B shows a process 220, according to one aspect of the present disclosure. Process 220 begins in block B224, when the various components of the cloud layer 136 (FIG. 1) have been initialized and operational. As an example, a user interface provided by the cloud storage manager 122 is made available to a user system 108 to configure the cloud storage volume 142. The cloud storage manager 122 interfaces with the cloud storage OS 140 to configure the cloud volume 142. The cloud storage OS 140 interfaces with the QoS module 106 for executing the process blocks of process 220.

A request to create a storage volume (e.g., 142) is received by the cloud storage OS 140. As an example, the request is received from the user system 108/host 102 and forwarded by the cloud storage manager 122 to the cloud storage OS 140. The cloud storage OS 140 creates the cloud volume 142. The cloud storage OS 140 sets a file system protocol (e.g., NFS, SMB (Server Message Block) or any other protocol) that is used to read and write data using the cloud storage volume 142. The cloud storage OS 140 also assigns a volume identifier (e.g., a volume name or any other parameter), a geographical region indicating where data associated with the cloud storage volume 142 will be stored, a time zone, a volume path to access the cloud volume 142, an allocated storage capacity for the cloud volume 142, a protocol version, e.g., if NFS is selected as the protocol, a NFS version, namely, NFSv3, NFSv4.1 or both can be selected, a security option, network access parameters (e.g., Internet Protocol addresses, network domain and other parameters) that will enable access to the cloud volume 142 via the connection system 118, and a storage volume group identifier, if the cloud volume 142 is to be part of a storage volume group.

Furthermore, the cloud storage OS 140 mounts the cloud volume 142 using the designated volume path i.e. the cloud volume 142 is brought online. The term "mount" in this context means mounting the cloud volume 142 to a junction. The following command may be used by the cloud storage OS 140 to mount the cloud volume 142: "volume mount-vserver svm_name-volume volume_name-junction-path junction_path." The vserver Svm_name indicates the name of a virtual storage server that is used for the cloud volume 142, the volume-name indicates the name of the volume and the junction_path indicates the path to access the volume. The cloud storage OS 140 also notifies the QoS module 106 of the cloud volume 142.

In block 224, the QoS module 106 automatically generates a workload II) and assigns the workload ID to the cloud volume 142.

In block B226, the QoS module 106 maps the workload ID to the volume identifier. The workload ID is controlled and managed by the QoS module 106 to provide QoS for the cloud volume 142. The QoS module 106 updates the mapping data structure 130 to map the workload ID to the volume identifier assigned by the cloud storage OS 140.

In block B228, the QoS module 106 automatically associates the policy 138 to the cloud volume 142. The policy 138 is either an existing policy or a new policy created for the cloud volume 142. The associated policy 138 is identified by a policy identifier and a policy name, and defines QoS parameters for the cloud volume 142, e.g., the number of IOPS, throughput or any other parameter. It is noteworthy that policy 138 may be shared across multiple volumes, when the cloud storage volume 142 is part of a storage volume group. This is different from conventional systems, where a user must manually assign a policy to a storage volume vis-à-vis the QoS module 106 automatically assigning the policy 138.

When the cloud storage volume 142 is part of a volume group, then in block 13230, the QoS module 106 updates a policy parameter that impacts the entire storage volume group. For example, if the storage volume group has 4 storage volumes and is assigned 100 IOPS, each storage volume is allocated 25 IOPS. When the new cloud volume 142 is added to the group, the number of IOPS for each volume is reduced to 20 IOPS. The policy parameter is also modified in block B232, when a storage volume group size increases or decreases (e.g., if a storage volume is deleted from the group or the allocated size of a storage volume is decreased).

In block B234, when the cloud volume 142 is brought offline or unmounted, the workload identifier is deleted. The associated policy object may also be removed, if there is no other volume associated with the policy object.

Process 220 enables the QoS module 106 to manage QoS configuration at a group level using a single policy object. Managing a single object is more efficient than managing multiple policy objects and also takes less storage space. Conventional systems do not automatically scale a policy for a storage volume group.

Figure 2C:
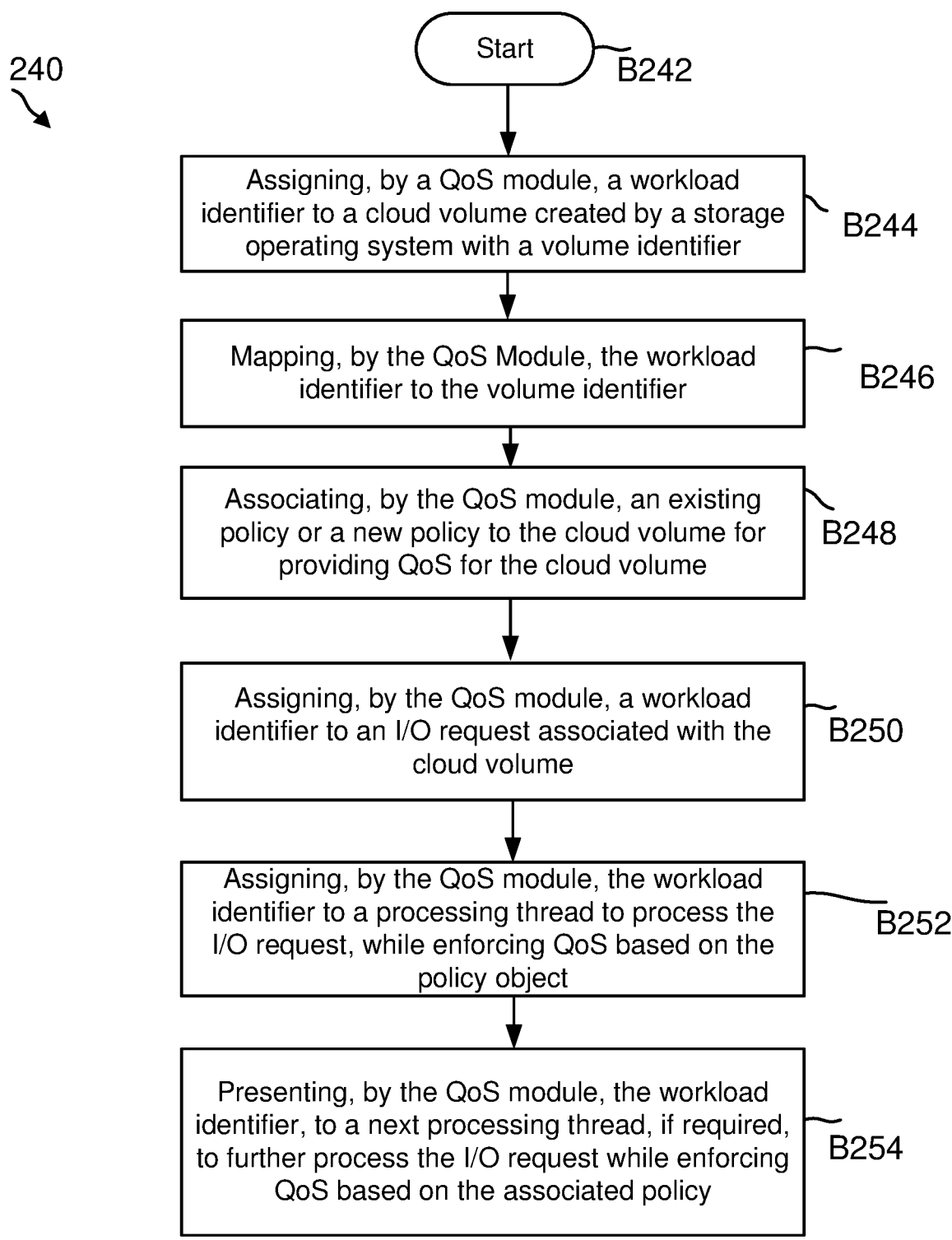
FIG. 2C shows a process for processing input/output ("I/O") requests, according to one aspect of the present disclosure.

FIG. 2C shows a process 240, according to one aspect of the present disclosure. Process 240 begins in block B242, when the various components of the cloud layer 136 (FIG. 1) have been initialized and operational. As an example, a user interface provided by the cloud storage manager 122 is made available to a user system 108/host 102 to configure the cloud storage volume 142. The cloud storage manager 122 interfaces with the cloud storage OS 140 to configure the cloud volume 142. The cloud storage OS 140 interfaces with the QoS module 106 for executing the process blocks of process 240.

A request to create a storage volume (e.g., 142) is received by the cloud storage OS 140. As an example, the request is received from the user system 108/host 102 and forwarded by the cloud storage manager 122 to the cloud storage OS 140. The cloud storage OS 140 creates the cloud volume 142. The cloud storage OS 140 sets a file system protocol (e.g., NFS, SMB (Server Message Block) or any other protocol) that is used to read and write data using the cloud storage volume 142. The cloud storage OS 140 also assigns a volume identifier (e.g., a volume name or any other parameter), a geographical region indicating where data associated with the cloud storage volume 142 will be stored, a time zone, a volume path to access the cloud volume 142, an allocated storage capacity for the cloud volume 142, a protocol version, e.g., if NFS is selected as the protocol, a NFS version, namely, NFSv3, NFSv4.1 or both can be selected, a security option, network access parameters (e.g., Internet Protocol addresses, network domain and other parameters) that will enable access to the cloud volume 142 via the connection system 118, and a storage volume group identifier, if the cloud volume 142 is to be part of a storage volume group.

Furthermore, the cloud storage OS 140 mounts the cloud volume 142 using the designated volume path i.e. the cloud volume 142 is brought online. The term "mount" in this context means mounting the cloud volume 142 to a junction. The following command may be used by the cloud storage OS 140 to mount the cloud volume 142: "volume mount-vserver svm_name-volume volume_name-junction-path junction_path." The vserver Svm_name indicates the name of a virtual storage server that is used for the cloud volume 142, the volume-name indicates the name of the volume and the junction_path indicates the path to access the volume. The cloud storage OS 140 also notifies the QoS module 106 of the cloud volume 142.

In block 244, the QoS module 106 automatically generates a workload ID and assigns the workload ID to the cloud volume 142.

In block B246, the QoS module 106 maps the workload ID to the volume identifier. The workload ID is controlled and managed by the QoS module 106 to provide QoS for the cloud volume 142. The QoS module 106 updates the mapping data structure 130 to map the workload ID to the volume identifier assigned by the cloud storage OS 140.

In block B248, the QoS module 106 automatically associates a policy 138 to the cloud volume 142. The policy 138 is either an existing policy 138 or a new policy 138 is created for the cloud volume 142. The associated policy 138 is identified by a policy identifier and a policy name, and defines QoS parameters for the cloud volume 142, e.g., the number of IOPS, throughput or any other parameter. It is noteworthy that policy 138 may be shared across multiple volumes, when the cloud storage volume 142 is part of a storage volume group. This is different from conventional systems, where a user must manually assign a policy to a storage volume vis-à-vis the QoS module 106 automatically assigning the policy 138.

In block B250, an I/O request is received by the cloud storage OS 140 to read or write data using the cloud volume 142. The QoS module 106 assigns the workload ID to the I/O request. This enables the QoS module 106 to determine the wait time. i.e., the duration the I/O request waits, before being selected for processing by a processing thread (not shown) of the cloud storage OS 140 and the service time. i.e., the time the processing thread takes to process the request.

In block B252, after the processing thread selects the I/O request for processing, the QoS module 106 assigns the workload ID to the processing thread through a scheduler (e.g., 311, FIG. 3) of the cloud storage OS 140. The scheduler 311 receives the workload ID from the QoS module 106 and provides it to the processing thread. This enables the QoS module 106 (via the scheduler 311) to determine the time the processing thread takes to process the I/O request (i.e. the service time) as well as the wait time i.e., the time that the 1/O request had to wait before being selected. This enables the QoS Module 106 to throttle I/O request processing based on the associated policy. If another processing thread is required, then in block B254, the workload ID) is provided to the next thread by the scheduler 311, similar to block B252.

Process 240 technology enables the QoS module 106 to provide QoS without having access to the Free BSD operating system scheduler (or any scheduler outside the cloud storage OS 140). The technology is flexible because the QoS module 106 and the cloud storage OS 140 can be deployed in any operating system environment and it can independently provide QoS regardless of the operating system.

Figure 2D:
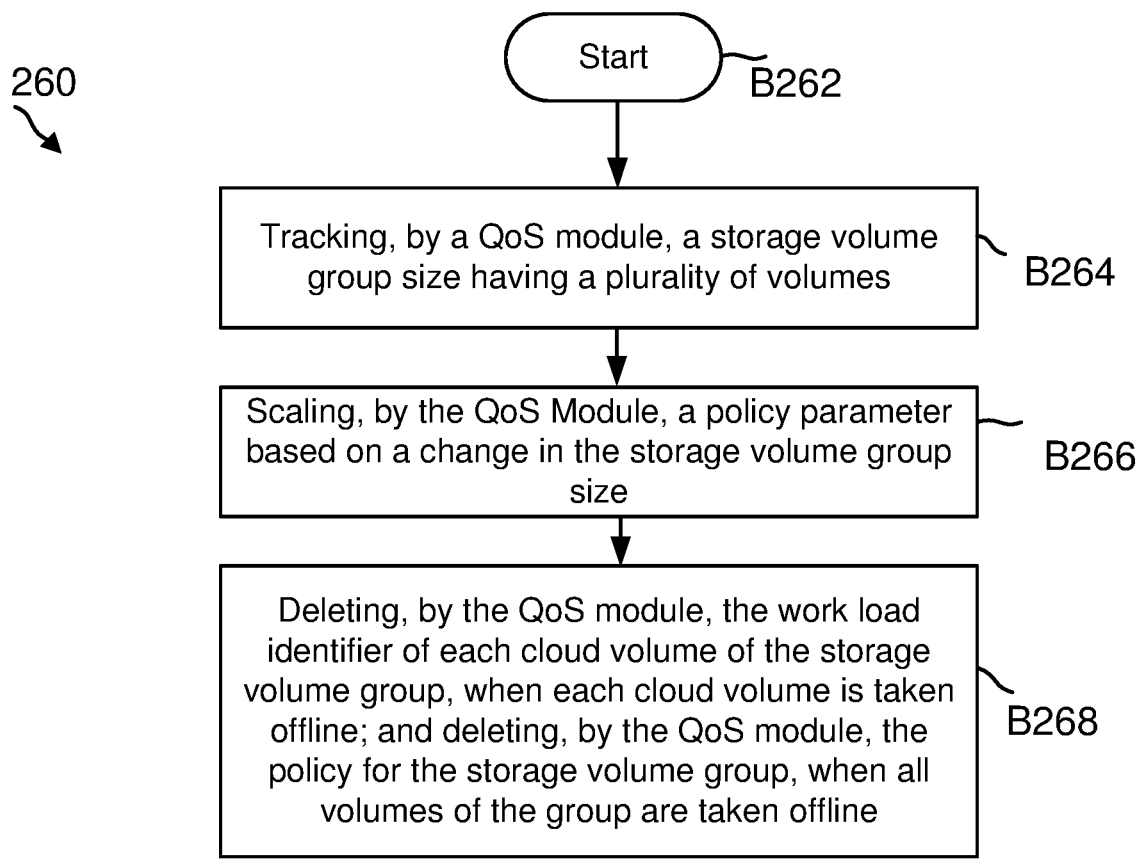
FIG. 2D shows a process for updating a policy by the QoS module, according to one aspect of the present disclosure.

FIG. 2D shows a process 260, according to one aspect of the present disclosure. Process 260 begins in block B262, when the various components of the cloud layer 136 (FIG. 1) have been initialized and operational. As an example, a user interface provided by the cloud storage manager 122 is made available to a user system 108/host 102 to configure the cloud storage volume 142. The cloud storage manager 122 interfaces with the cloud storage OS 140 to configure the cloud volume 142. The cloud storage OS 140 interfaces with the QoS module 106 for executing the process blocks of process 260.

A request to create a storage volume (e.g., 142) is received by the cloud storage OS 140. As an example, the request is received from the user system 108/host 102 and forwarded by the cloud storage manager 122 to the cloud storage OS 140. The cloud storage OS 140 creates the cloud volume 142. The cloud storage OS 140 sets a file system protocol (e.g., NFS, SMB (Server Message Block) or any other protocol) that is used to read and write data using the cloud storage volume 142. The cloud storage OS 140 also assigns a volume identifier (e.g., a volume name or any other parameter), a geographical region indicating where data associated with the cloud storage volume 142 will be stored, a time zone, a volume path to access the cloud volume 142, an allocated storage capacity for the cloud volume 142, a protocol version, e.g., if NFS is selected as the protocol, a NFS version, namely, NFSv3, NFSv4.1 or both can be selected, a security option, network access parameters (e.g., Internet Protocol addresses, network domain and other parameters) that will enable access to the cloud volume 142 via the connection system 118, and a storage volume group identifier, if the cloud volume 142 is to be part of a storage volume group.

Furthermore, the cloud storage OS 140 mounts the cloud volume 142 using the designated volume path i.e. the cloud volume 142 is brought online. The term "mount" in this context means mounting the cloud volume 142 to a junction. The following command may be used by the cloud storage OS 140 to mount the cloud volume 142: "volume mount-vserver svm_name-volume volume_name-junction-path junction_path." The vserver Svm_name indicates the name of a virtual storage server that is used for the cloud volume 142, the volume-name indicates the name of the volume and the junction_path indicates the path to access the volume. The cloud storage OS 140 also notifies the QoS module 106 of the cloud volume 142.

The QoS module 106 automatically generates a workload ID and assigns the workload ID to the cloud volume 142. The QoS module 106 then maps the workload ID to the volume identifier. The workload ID is controlled and managed by the QoS module 106 to provide QoS for the cloud volume 142. The QoS module 106 updates the mapping data structure 130 to map the workload ID to the volume identifier assigned by the cloud storage OS 140. The QoS module 106 also automatically associates a policy 138 to the cloud volume 142. The policy 138 is either an existing policy 138 or a new policy 138 is created for the cloud volume 142. The associated policy 138 is identified by a policy identifier and a policy name, and defines QoS parameters for the cloud volume 142, e.g., the number of IOPS, throughput or any other parameter. It is noteworthy that policy 138 may be shared across multiple volumes, when the cloud storage volume 142 is part of a volume group. This is different from conventional systems, where a user must manually assign a policy to a storage volume vis-à-vis the QoS module 106 automatically assigning the policy 138.

When the cloud volume 142 is part of a storage volume group, then in block B264, the QoS module 106 tracks the size of the storage volume group. In block B266, one or more policy parameter for the group is scaled up or down (i.e., increased up or down), based on a change in the size of the storage volume group.

In block B268, the QoS module 106 deletes the workload ID of each cloud volume that is brought offline i.e. unmounted. The associated policy 138 is also deleted for the storage volume group, if the policy 138 is not referenced or used by any other cloud volume. This enables the QoS module 106 to efficiently manage policy objects that are used by more than one cloud volume because it is easier to use a single policy object to track QoS requirements for different cloud volumes.

Figure 2E:
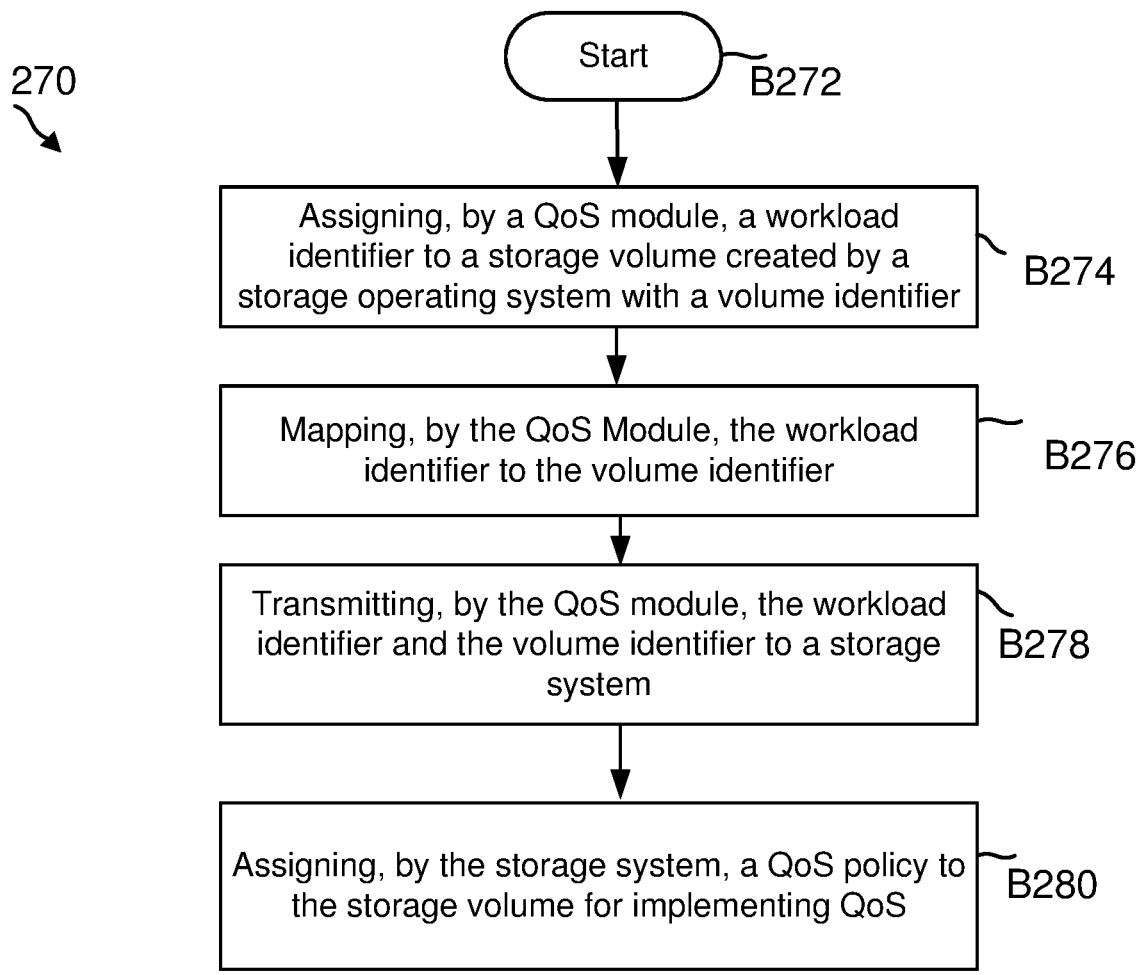
FIG. 2E shows another process for providing QoS using a workload identifier, according to one aspect of the present disclosure.

FIG. 2E shows a process 270, according to one aspect of the present disclosure. Process 270 begins in block B272, when the various components of the cloud layer 136 (FIG.

1) have been initialized and operational. As an example, a user interface provided by the cloud storage manager 122 is made available to a user system 108/host 102 to configure the cloud storage volume 142. The cloud storage manager 122 interfaces with the cloud storage OS 140 to configure the cloud volume 142. The cloud storage OS 140 interfaces with the QoS module 106 for executing the process blocks of process 270.

A request to create a storage volume (e.g., 142) is received by the cloud storage OS 140. As an example, the request is received from the user system 108/host 102 and forwarded by the cloud storage manager 122 to the cloud storage OS 140. The cloud storage OS 140 creates the cloud volume 142. The cloud storage OS 140 sets a file system protocol (e.g., NFS, SMB (Server Message Block) or any other protocol) that is used to read and write data using the cloud storage volume 142. The cloud storage OS 140 also assigns a volume identifier (e.g., a volume name or any other parameter), a geographical region indicating where data associated with the cloud storage volume 142 will be stored, a time zone, a volume path to access the cloud volume 142, an allocated storage capacity for the cloud volume 142, a protocol version, e.g., if NFS is selected as the protocol, a NFS version, namely, NFSv3, NFSv4.1 or both can be selected, a security option, network access parameters (e.g., Internet Protocol addresses, network domain and other parameters) that will enable access to the cloud volume 142 via the connection system 118, and a storage volume group identifier, if the cloud volume 142 is to be part of a storage volume group.

Furthermore, the cloud storage OS 140 mounts the cloud volume 142 using the designated volume path i.e. the cloud volume 142 is brought online. The term "mount" in this context means mounting the cloud volume 142 to a junction. The following command may be used by the cloud storage OS 140 to mount the cloud volume 142: "volume mount-vserver svm_name-volume volume_name-junction-path junction_path." The vserver Svm_name indicates the name of a virtual storage server that is used for the cloud volume 142, the volume-name indicates the name of the volume and the junction_path indicates the path to access the volume. The cloud storage OS 140 also notifies the QoS module 106 of the cloud volume 142.

In block 274, the QoS module 106 automatically generates a workload ID and assigns the workload ID to the cloud volume 142.

In block B276, the QoS module 106 maps the workload ID to the volume identifier. The workload ID is controlled and managed by the QoS module 106 to provide QoS for the cloud volume 142. The QoS module 106 updates the mapping data structure 130 to map the workload ID to the volume identifier assigned by the cloud storage OS 140.

In block B278, the QoS module 106 provides the workload ID to an underlying storage system that manages QoS policy and QoS for the cloud volume 142. The QoS module 106 may provide the workload ID to the cloud storage OS that transmits the workload ID to the underlying storage system.

In block B280, the underlying storage system associates a QoS policy to the cloud volume 142 and the workload ID. The underlying storage manages QoS based on the assigned policy and the workload ID.

Process 270 provides technology that enables QoS regardless of the entity that manages the actual storage space. The QoS module 106 and the cloud storage OS 140 interface with the underlying storage system to implement QoS policies.

In one aspect of the present disclosure, a processor executable method is provided. The method includes: assigning (e.g., block B224, FIG. 2B), by a processor executable micro-service (e.g., QoS Module 106, FIG. 1), a workload identifier to a cloud volume (e.g., 142, FIG. 1) created by a storage operating system (e.g., 140, FIG. 1), the micro-service and the storage operating system deployed in a cloud-based system (e.g., cloud layer 136, FIG. 1) for providing quality of service ("QoS") for storing and retrieving data via the cloud-based system; mapping (e.g., block B226, FIG. 2B), by the micro-service, the workload identifier to a volume identifier, the volume identifier generated by the storage operating system to identify the cloud volume (e.g., B224); associating (e.g., B228, FIG. 2B), by the micro-service, a policy with the cloud volume for providing QoS for the cloud volume; determining (e.g., B250, FIG. 2C), by the micro-service, the workload identifier for the cloud volume from the volume identifier included in a request to store or retrieve data using the cloud volume; assigning (e.g., B252, FIG. 2C), by the micro-service, the workload identifier to a processing thread deployed by the storage operating system to process the request; and utilizing (e.g., B214, FIG. 2A), by the micro-service, the workload identifier assigned to the processing thread for providing QoS based on a parameter of the policy.

In another aspect, the method further includes determining (e.g., B264, FIG. 2D), by the micro-service, a change in a size of a storage volume group that includes the cloud volume; and updating (B266, FIG. 2D), by the micro-service, the parameter, based on the determined change to provide QoS for each cloud volume of the storage volume group.

In yet another aspect, the associating, by the micro-service, the policy, further comprises: creating (e.g., B228, FIG. 2B), by the micro-service, the policy, when the policy does not exist; and updating (e.g., B230, FIG. 2B), by the micro-service, the policy, when the policy already exists.

In another aspect, the workload identifier is assigned to the cloud volume, after the cloud volume is mounted (e.g., B208, FIG. 2A) by the storage operating system for deployment and the micro-service is notified of the cloud volume by the storage operating system.

In yet another aspect, the policy is determined (e.g., B280, FIG. 2E) by a storage entity separate from the storage operating system, and the workload identifier is provided to the storage entity by the micro-service to enforce QoS based on the policy.

Figure 3:
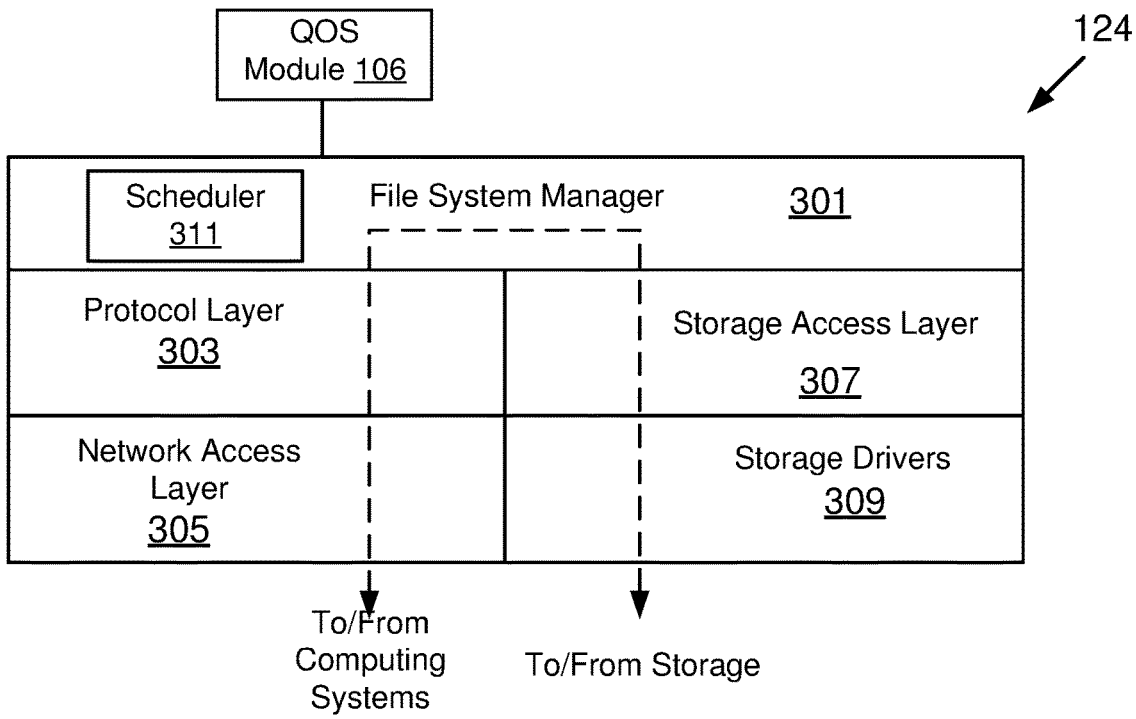
FIG. 3 shows an example of a storage operating system, used according to one aspect of the present disclosure.

Storage Operating System: FIG. 3 illustrates a generic example of storage operating system 124 executed by storage system 120 (or the cloud storage OS 140 in the cloud layer 136) and interfacing with the QoS module 106, according to one aspect of the present disclosure. In another aspect, the QoS module 106 is integrated with the storage operating system 124/cloud storage OS 140.

As an example, operating system 230 may include several modules, or "layers". These layers include a file system manager 301 that keeps track of a directory structure (hierarchy) of the data stored in storage devices and manages read/write operations, i.e. executes read/write operations on storage devices in response to server system 102 requests. The file system manager 301 may also include a scheduler 311 that interfaces with the QoS module 106 for tracking service times and wait times using the workload ID assigned to each cloud volume, as described above in detail.

Operating system 124 may also include a protocol layer 303 and an associated network access layer 305 to communicate over a network with other systems, such as host system 102A-102N and the cloud layer 136. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102A-102N and mass storage devices 114 are illustrated schematically as a path, which illustrates the flow of data through operating system 124.

The operating system 124 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure may be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
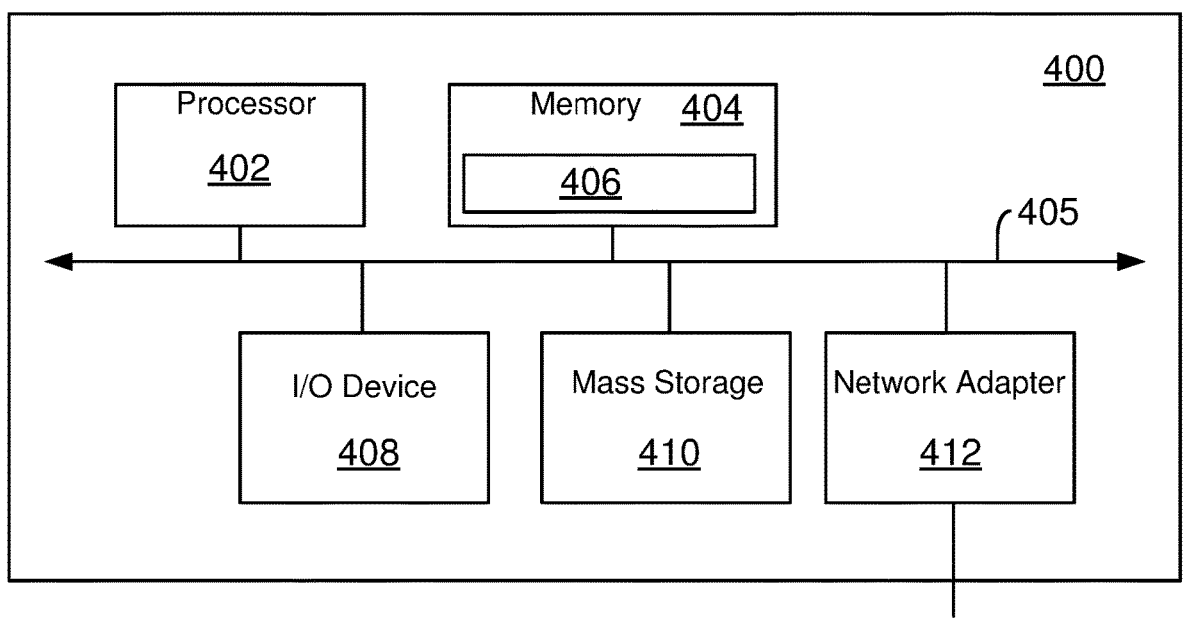
FIG. 4 shows an example of a processing system, used according to one aspect of the present disclosure.

Processing System: FIG. 4 is a high-level block diagram showing an example of the architecture of a processing system, at a high level, in which executable instructions as described above may be implemented. The processing system 400 can represent modules of the storage system 120, host systems 102A-102N, components of the cloud layer 136, user 108, a computing system executing the cloud manager 122, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 2A-2E.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for providing QoS for cloud-based storage have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:
1. A method, comprising:
assigning, by a processor executable micro-service, a workload identifier to a cloud volume created by a storage operating system, the micro-service and the storage operating system deployed in a cloud-based system for providing quality of service ("QoS") for storing and retrieving data via the cloud-based system;

mapping, by the micro-service, the workload identifier to a volume identifier, the volume identifier generated by the storage operating system to identify the cloud volume;

associating, by the micro-service, a policy with the cloud volume for providing QoS for the cloud volume, wherein associating, by the micro-service, the policy, further comprises creating, by the micro-service, the policy, when the policy does not exist, and updating, by the micro-service, the policy, when the policy already exists;

determining, by the micro-service, the workload identifier for the cloud volume from the volume identifier included in a request to store or retrieve data using the cloud volume;

assigning, by the micro-service, the workload identifier to a processing thread deployed by the storage operating system to process the request; and utilizing, by the micro-service, the workload identifier assigned to the processing thread for providing QoS based on a parameter of the policy.

2. The method of claim 1, further comprising:

determining, by the micro-service, a change in a size of a storage volume group that includes the cloud volume; and updating, by the micro-service, the parameter, based on the determined change to provide QoS for each cloud volume of the storage volume group.

3. The method of claim 1, wherein the workload identifier is assigned to the cloud volume, after the cloud volume is mounted by the storage operating system for deployment and the micro-service is notified of the cloud volume by the storage operating system.

4. The method of claim 1, wherein the policy is determined by a storage entity separate from the storage operating system, and the workload identifier is provided to the storage entity by the micro-service to enforce QoS based on the policy.

5. The method of claim 1, wherein the parameter is a number of input/output operations that can be processed for the cloud volume within a defined period.

6. The method of claim 1, wherein the parameter is a total amount of data that can be transferred for the cloud volume.

7. A non-transitory machine-readable storage medium having stored thereon instructions for performing a method, comprising machine executable code which when executed by one or more machines, causes the one or more machines to:

assign, by a micro-service, a workload identifier to a cloud volume created by a storage operating system, the micro-service and the storage operating system deployed in a cloud-based system for providing quality of service ("QoS") for storing and retrieving data via the cloud-based system;

map, by the micro-service, the workload identifier to a volume identifier, the volume identifier generated by the storage operating system to identify the cloud volume;

associate, by the micro-service, a policy with the cloud volume for providing QoS for the cloud volume, wherein associate, by the micro-service, the policy, further comprises create, by the micro-service, the policy, when the policy does not exist, and update, by the micro-service, the policy, when the policy already exists;

determine, by the micro-service, the workload identifier for the cloud volume from the volume identifier included in a request to store or retrieve data using the cloud volume;

assign, by the micro-service, the workload identifier to a processing thread deployed by the storage operating system to process the request; and utilize, by the micro-service, the workload identifier assigned to the processing thread for providing QoS based on a parameter of the policy.

8. The non-transitory machine-readable storage medium of claim 7, wherein the machine executable code further causes the one or more machines to:

determine, by the micro-service, a change in a size of a storage volume group that includes the cloud volume; and update, by the micro-service, the parameter, based on the determined change to provide QoS for each cloud volume of the storage volume group.

9. The non-transitory machine-readable storage medium of claim 7, wherein the workload identifier is assigned to the cloud volume, after the cloud volume is mounted by the storage operating system for deployment and the micro-service is notified of the cloud volume by the storage operating system.

10. The non-transitory machine-readable storage medium of claim 7, wherein the policy is determined by a storage entity separate from the storage operating system, and the workload identifier is provided to the storage entity by the micro-service to enforce QoS based on the policy.

11. The non-transitory machine-readable storage medium of claim 7, wherein the parameter is a number of input/output operations that can be processed for the cloud volume within a defined period.

12. The non-transitory machine-readable storage medium of claim 7, wherein the parameter is a total amount of data that can be transferred for the cloud volume.

13. A system, comprising:

a memory containing machine readable medium comprising machine executable code having stored thereon instructions; and a processor coupled to the memory to execute the machine executable code to :

assign, by a micro-service, a workload identifier to a cloud volume created by a storage operating system, the micro-service and the storage operating system deployed in a cloud-based system for providing quality of service ("QoS") for storing and retrieving data via the cloud-based system;

map, by the micro-service, the workload identifier to a volume identifier, the volume identifier generated by the storage operating system to identify the cloud volume;

associate, by the micro-service, a policy with the cloud volume for providing QoS for the cloud volume, wherein associate, by the micro-service, the policy, further comprises create, by the micro-service, the policy, when the policy does not exist, and update, by the micro-service, the policy, when the policy already exists;

determine, by the micro-service, the workload identifier for the cloud volume from the volume identifier included in a request to store or retrieve data using the cloud volume;

assign, by the micro-service, the workload identifier to a processing thread deployed by the storage operating system to process the request; and utilize, by the micro-service, the workload identifier assigned to the processing thread for providing QoS based on a parameter of the policy.

14. The system of claim 13, wherein the machine executable code further causes to:

determine, by the micro-service, a change in a size of a storage volume group that includes the cloud volume; and update, by the micro-service, the parameter, based on the determined change to provide QoS for each cloud volume of the storage volume group.

15. The system of claim 13, wherein the workload identifier is assigned to the cloud volume, after the cloud volume is mounted by the storage operating system for deployment and the micro-service is notified of the cloud volume by the storage operating system.

16. The system of claim 13, wherein the parameter is a number of input/output operations that can be processed for the cloud volume within a defined period.

17. The system of claim 13, wherein the parameter is a total amount of data that can be transferred for the cloud volume.

18. A method, comprising:

assigning, by a processor executable micro-service, a workload identifier to a cloud volume created by a storage operating system, the micro-service and the storage operating system deployed in a cloud-based system for providing quality of service ("QoS") for storing and retrieving data via the cloud-based system;

mapping, by the micro-service, the workload identifier to a volume identifier, the volume identifier generated by the storage operating system to identify the cloud volume;

associating, by the micro-service, a policy with the cloud volume for providing QoS for the cloud volume;

determining, by the micro-service, the workload identifier for the cloud volume from the volume identifier included in a request to store or retrieve data using the cloud volume;

assigning, by the micro-service, the workload identifier to a processing thread deployed by the storage operating system to process the request;

utilizing, by the micro-service, the workload identifier assigned to the processing thread for providing QoS based on a parameter of the policy;

determining, by the micro-service, a change in a size of a storage volume group that includes the cloud volume; and updating, by the micro-service, the parameter, based on the determined change to provide QoS for each cloud volume of the storage volume group.

19. A non-transitory machine-readable storage medium having stored thereon instructions for performing a method, comprising machine executable code which when executed by one or more machines, causes the one or more machines to:

assign, by a micro-service, a workload identifier to a cloud volume created by a storage operating system, the micro-service and the storage operating system deployed in a cloud-based system for providing quality of service ("QoS") for storing and retrieving data via the cloud-based system;

map, by the micro-service, the workload identifier to a volume identifier, the volume identifier generated by the storage operating system to identify the cloud volume;

associate, by the micro-service, a policy with the cloud volume for providing QoS for the cloud volume;

determine, by the micro-service, the workload identifier for the cloud volume from the volume identifier included in a request to store or retrieve data using the cloud volume;

assign, by the micro-service, the workload identifier to a processing thread deployed by the storage operating system to process the request;

utilize, by the micro-service, the workload identifier assigned to the processing thread for providing QoS based on a parameter of the policy;

determine, by the micro-service, a change in a size of a storage volume group that includes the cloud volume; and update, by the micro-service, the parameter, based on the determined change to provide QoS for each cloud volume of the storage volume group.

20. A system, comprising:

a memory containing machine readable medium comprising machine executable code having stored thereon instructions; and a processor coupled to the memory to execute the machine executable code to :

assign, by a micro-service, a workload identifier to a cloud volume created by a storage operating system, the micro-service and the storage operating system deployed in a cloud-based system for providing quality of service ("QoS") for storing and retrieving data via the cloud-based system;

map, by the micro-service, the workload identifier to a volume identifier, the volume identifier generated by the storage operating system to identify the cloud volume;

associate, by the micro-service, a policy with the cloud volume for providing QoS for the cloud volume;

determine, by the micro-service, the workload identifier for the cloud volume from the volume identifier included in a request to store or retrieve data using the cloud volume;

assign, by the micro-service, the workload identifier to a processing thread deployed by the storage operating system to process the request;

utilize, by the micro-service, the workload identifier assigned to the processing thread for providing QoS based on a parameter of the policy;

determine, by the micro-service, a change in a size of a storage volume group that includes the cloud volume; and update, by the micro-service, the parameter, based on the determined change to provide QoS for each cloud volume of the storage volume group.

* * * * *